United States Patent
Oestreich et al.

[11] Patent Number: 5,487,126
[45] Date of Patent: Jan. 23, 1996

[54] OPTICAL CABLE AND PROCESS FOR PRODUCING THE SAME

[75] Inventors: Ulrich Oestreich, München; Reiner Schneider, Ebersdorf b. Coburg, both of Germany

[73] Assignee: Siemens Aktiengesellschaft, Munich, Germany

[21] Appl. No.: 295,812

[22] PCT Filed: Feb. 19, 1993

[86] PCT No.: PCT/DE93/00146

§ 371 Date: Sep. 2, 1994

§ 102(e) Date: Sep. 2, 1994

[87] PCT Pub. No.: WO93/18424

PCT Pub. Date: Sep. 16, 1993

[30] Foreign Application Priority Data

Mar. 3, 1992 [DE] Germany .................... 42 06 652.2

[51] Int. Cl.⁶ .................... G02B 6/44; B21F 17/00
[52] U.S. Cl. .................... 385/105; 385/103; 385/106; 385/109; 385/110; 385/112; 385/113; 385/114; 242/7.02
[58] Field of Search .................... 385/100, 109, 385/110, 111, 112, 114, 113, 103, 105; 242/7.01, 7.02, 7.22, 7.23

[56] References Cited

U.S. PATENT DOCUMENTS

| | | | |
|---|---|---|---|
| 4,329,018 | 5/1982 | Dubost | 385/114 X |
| 4,632,506 | 12/1986 | Taylor | 385/114 |
| 4,695,128 | 9/1987 | Zimmerman et al. | 385/111 |
| 4,709,983 | 12/1987 | Plessner et al. | 385/114 X |
| 4,802,732 | 2/1989 | Fukuma et al. | 385/114 X |
| 4,997,257 | 3/1991 | Spedding | 385/110 |
| 5,071,221 | 12/1991 | Fujitani et al. | 385/100 |
| 5,163,116 | 11/1992 | Oestreich et al. | 385/111 |
| 5,166,998 | 11/1992 | Patel | 385/114 |
| 5,179,611 | 1/1993 | Umeda et al. | 385/110 |
| 5,199,094 | 3/1993 | Schneider | 385/100 |
| 5,210,831 | 5/1993 | Oestreich et al. | 385/105 |
| 5,229,851 | 7/1993 | Rahman | 385/114 |
| 5,249,249 | 9/1993 | Eoll et al. | 385/114 |

FOREIGN PATENT DOCUMENTS

| | | | |
|---|---|---|---|
| 0295130 | 12/1988 | European Pat. Off. | G02B 6/44 |
| 0495400A3 | 7/1992 | European Pat. Off. | G02B 6/44 |
| 2549235 | 1/1985 | France | G02B 6/04 |
| 3839109 | 5/1990 | Germany | G02B 6/44 |
| 2040063 | 8/1980 | United Kingdom | G02B 6/44 |
| 2199961 | 7/1988 | United Kingdom | G02B 6/44 |

*Primary Examiner*—Brian Healy
*Attorney, Agent, or Firm*—Hill, Steadman & Simpson

[57] ABSTRACT

Supporting elements designed as independent profiles are provided between ribbon stacks of optical waveguide ribbons of an optical cable. The supporting elements contribute to positing securing of the ribbon stacks within the opposite table.

39 Claims, 5 Drawing Sheets

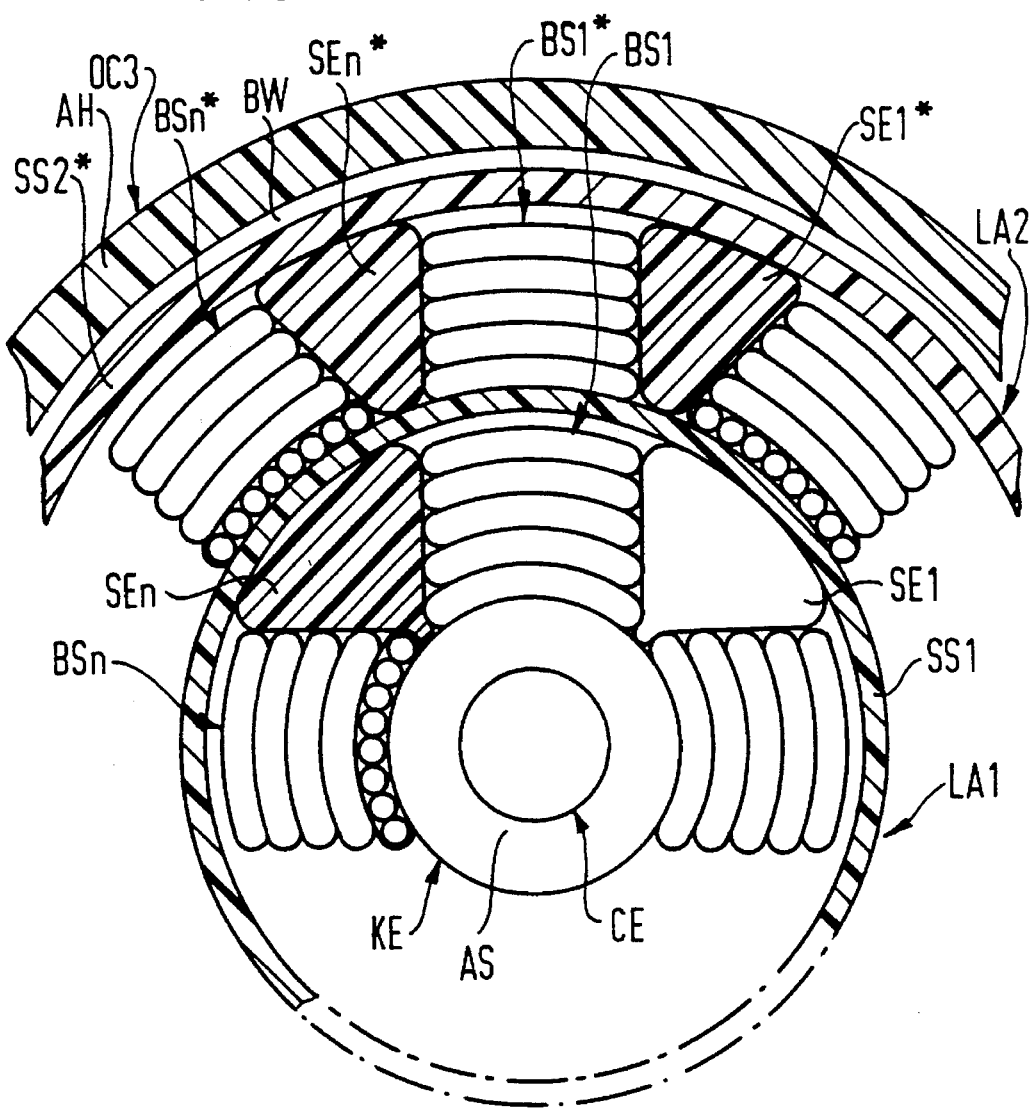

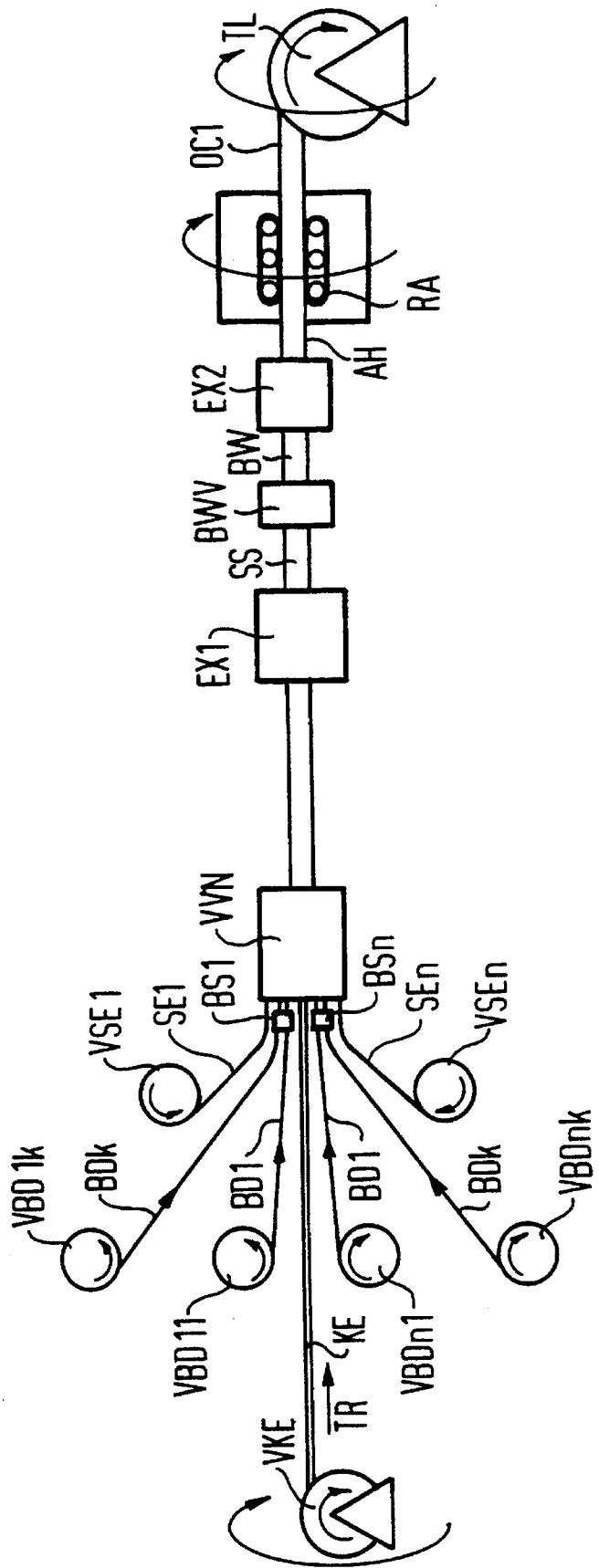

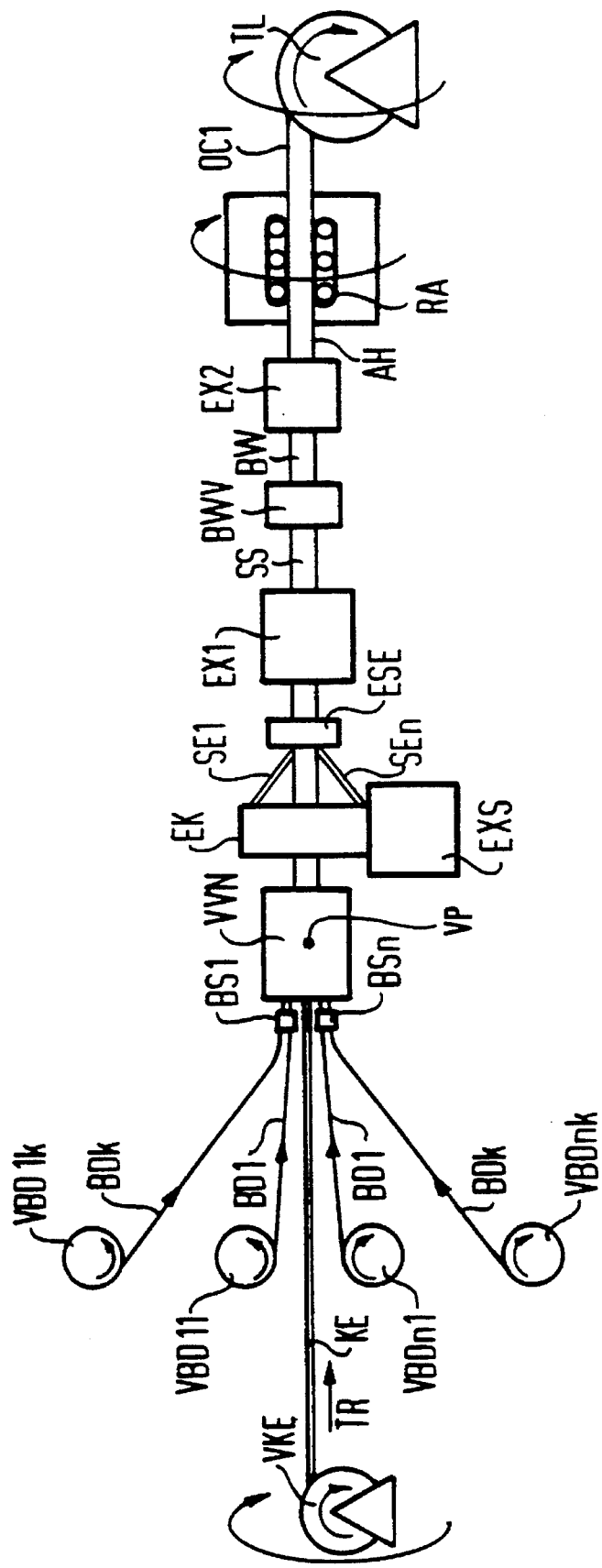

OPTICAL CABLE AND PROCESS FOR PRODUCING THE SAME

BACKGROUND OF THE INVENTION

1. Field of the Invention

The present invention relates to optical cables and, more particularly, this invention relates to an optical cable with a plurality of ribbon stacks of optical waveguide ribbons which are arranged in at least one layer around a core element.

2. Description of the Related Art

An optical cable of this type is described in German Patent No. DE-A1-38 39 109. Its cable core consists of a plurality of chamber elements with approximately rectangular openings which are arranged around a tensile-load-resistant element. The chamber elements serve to receive ribbon stacks of optical waveguide ribbons.

Although an optical cable constructed in this manner from chamber elements provides, with appropriate wall thickness, reliable protection for the ribbon stacks against radial and circumferential forces, for the positional securing of the chamber elements, however, a special shaping of the chamber elements with sector-shaped side walls is necessary.

One aspect of the present invention is directed to a method in which, the positional securing of the ribbon stacks in optical cable can be ensured in a simpler manner.

This object is achieved in an optical cable of the type mentioned above having supporting elements designed as independent profiles which are provided in the interspaces formed by the ribbon stacks, such that the supporting elements contribute to a positional securing of the ribbon stacks.

In the optical cable of the present invention, it is therefore not necessary to provide specially shaped chamber elements. By virtue of this design, both the construction and the production of an optical cable with a plurality of ribbon stacks are simplified. According to another aspect of the invention, it is even possible to eliminate the chamber elements entirely. A design of this type is distinguished in that despite the fact that the ribbon stacks are free of chamber elements, they can be adequately secured in their position by arranging supporting elements in their interspaces.

According to another aspect of the invention, the profiles of the supporting elements extend radially somewhat further outwardly than the ribbon stacks. Thus, with this design, the supporting elements can exert a supporting pillar function with respect to radially acting transverse compressive forces.

According to another aspect of the invention, the supporting elements almost completely fill the interspaces between the ribbon stacks, that is to say without tolerance space. Thus, it is advantageously ensured that the optical waveguide ribbons collected to form ribbon stacks are held in their places in the respective ribbon stacks around the circumference. This allows positional securing of the ribbon stacks in the circumferential direction. This design is particularly useful when transverse compressive forces act in the circumferential direction. In this case it is desirable to use a flexible material for the supporting elements.

According to yet another aspect of the invention, the supporting elements only partly fill the interspaces between the ribbon stacks, that is to say there is an empty space between two adjacent ribbon stacks. They then serve primarily as radially extending spacers and supporting pillars in the interspaces of the ribbon stacks. For this function of the supporting elements, a stiff, smooth material which can be internally supported is desirable. In order to prevent this kind of supporting element from displacing or turning over, it is desirable that the supporting elements be fixed in their position.

The invention also relates to a process for producing an optical cable, wherein the supporting elements are designed as independent profiles which are introduced into the interspaces formed by the ribbon stacks in such a manner that the ribbon stacks are secured in their position.

The invention and its preferred embodiments are explained in greater detail below with reference to the in which:

FIG. 3 illustrates a cross section of an optical cable of the invention having two layers of ribbon stacks and supporting elements located between them.

FIG. 4 illustrates a diagrammatic view of a device for carrying out the process according to the present invention.

FIG. 5 illustrates a modified of the device shown in FIG. 4.

DETAILED DESCRIPTION OF THE PREFERRED EMBODIMENTS

Figure 1:
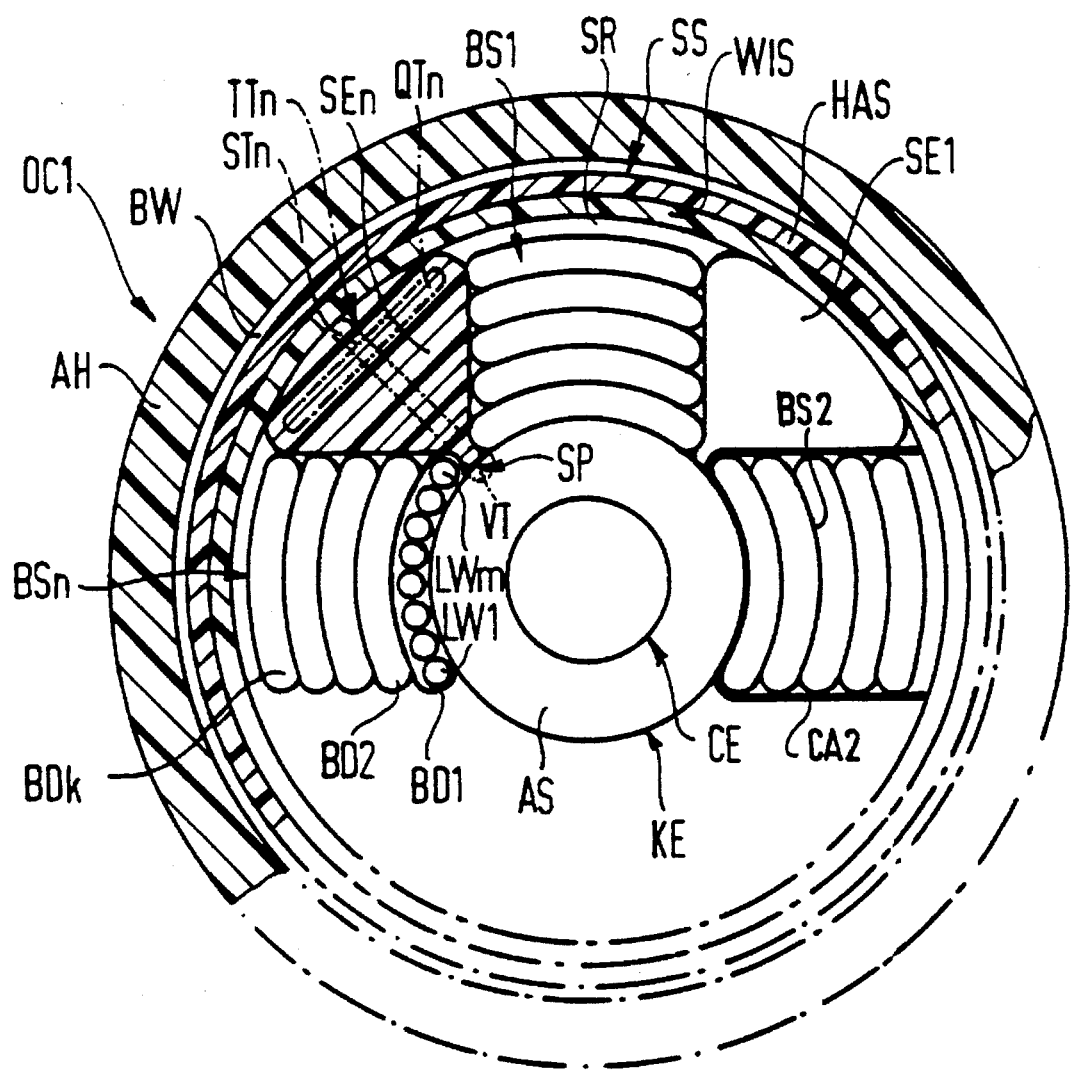
FIG. 1 illustrates a cross section through an enlarged view of an optical cable which incorporates the present invention.

FIG. 1 shows, in enlarged form, a cross section through the construction of an optical cable OC1. Its design has as cable elements a core element KE, a layer, applied thereto, of preferably approximately rectangular ribbon stacks BS1 to BSn with, also preferably, approximately flat, rectangular, preferably optical waveguide ribbons BD1 to BDk in each case, supporting elements SE1 to SEn inserted between these ribbon stacks BS1 to BSn in each case, a cover layer SS and an outer jacket with a reinforcement BW and an outer sleeve AH. For improved clarity, only a few ribbon stacks BS1–BSn and, included between them, supporting elements SE1–SEn are drawn in FIG. 1. For this reason, their dimensions are shown enlarged.

In the center of the circular-cylindrical core element KE, a tensile-load-resistant and compression-resistant, circular-cylindrical element CE is provided for protecting the optical cable OC1 against tensile and compressive loads. This tensile-resistant element CE may advantageously be constructed, for example, of a plurality of steel or aramid fibers. Onto this tensile-load- and compression-resistant element CE, a thickening layer AS is applied. The latter is dimensioned such that a desired number of ribbon stacks BS1 to BSn may be arranged annularly in a layer directly around the thickening layer AS. The thickening layer AS is desirably made of a relatively hard material, for example, such as, PE or PP. In this manner the core element KE can act as a stiff, compression-resistant foundation for the layer, which is directly applied to it, of ribbon stacks BS1 to BSn and the supporting elements SE1 to SEn incorporated there-between in each case.

The ribbon stacks BS1 to BSn of optical waveguide ribbons are arranged bearing directly against the core element KE by, for example, laying up on the latter annularly in a layer. k optical waveguide ribbons BD1 to BDk in each case are combined with m optical waveguides LW1 to LWm in each case to form one of the n ribbon stacks BS1 to BSn. The ribbon stacks BS1 to BSn have an approximately rectangular profile in cross section. In FIG. 1, the ribbon stack BSn, for example, comprises five optical waveguide ribbon lines with in each case eight optical waveguides. In the cross sectional diagram of FIG. 1, the innermost ribbon line BD1 of this stack BSn preferably bears directly, nestling in the circumferential direction, against the thickening layer AS of the core element KE. In this sectional plane, the innermost ribbon line BD1 thus runs curved in an arcuate manner. On this innermost ribbon line BD1, the other four ribbon lines are stacked in layers radially outward, these ribbon lines nestling essentially loosely against one another. Between the ribbon lines BD1–BDk and/or in the remaining interspaces of the cable core, conventional bundle materials or filling materials can expediently be introduced to obtain longitudinal watertightness. To hold the ribbon lines BD1 to BDk in each case at their positions in the ribbon stacks BS1 to BSn, they may, if appropriate, be adhesively bonded to one another and/or to the core element KE by means of an adhesive filling material. (Remaining interspaces may also be advantageously provided with this adhesive filling material.) PIB-containing materials, for example Naptel materials (Naphta-Chemic.), are advantageous for this purpose. As an additional measure against the lateral slipping of the ribbon lines BD1 to BDk of the ribbon stacks BS1 to BSn, the latter are expediently dimensioned such that their radial extent is smaller than their extent in the circumferential direction, that is to say they are wider than they are high. Since, by virtue of this dimensioning, the contact surface of the ribbon stacks BS1 to BSn on the core element KE is enlarged, and at the same time their surface-area of action in the radial direction with respect to transverse compressive forces is reduced, a cable construction with such ribbon stacks BS1 to BSn is to a certain extent more insensitive to transverse compressive forces. These ribbon stacks BS1 to BSn advantageously extend between 1 mm and 3 mm, and preferably between 1.5 mm and 2 mm, in the radial direction. Their extent along the circumference is desirably chosen so as to be between 1.5 mm and 5 mm, is preferably between 2 mm and 3 mm.

By the fact that the ribbon stacks BS1 to BSn are applied bearing closely, preferably wound helically, directly against the longitudinal axis of the circular-cylindrical core element KE, a more compact, rotationally symmetrical cable construction with constant external diameter results. The winding space available in the circumferential direction on the core element KE can thus be utilized optimally, so that a high packing density of ribbon stacks BS1 to BSn with ribbon lines BD1 to BDk can be obtained in the circumferential direction with simultaneous minimization of the cable diameter.

It is possible, if appropriate, for better space utilization to provide the optical waveguide ribbons BD1–BDk within a stack with an increasing number of optical waveguides towards the outside, so that the ribbon stack obtains an approximately wedge-shaped cross section. In this manner, an improved space utilization is obtained in the region of the cable core.

For the protection of the ribbon stacks BS1–BS11, the latter may also be located within in chamber elements. In FIG. 1, a chamber element CA2 of this type is drawn as a thick line and thus encloses the ribbon stack BS2. These chamber elements, CA2 for example, preferably have an approximately U-shaped cross section and are preferably open towards the outside. The present invention is subject to many variations, modifications and changes in detail. It is intended that all matter described throughout the specification be considered illustrative only. Accordingly, it is intended that the invention be limited only by the spirit and scope of the appended claims. These chamber elements need no sector-shaped side walls because their positional securing is effected by the supporting elements SE1–SEn. The chamber walls may also be very thin, that is to nay filigreed, in design, it not being necessary for them to have either a supporting effect in the radial direction or a position-stabilizing effect in the circumferential direction. Optical waveguides may be inserted into these chamber elements either loosely, if appropriate, or preferably combined as an approximately rectangular bundle.

A lay length of between 400 and 700 mm is expediently chosen for the ribbon stacks BD1–BDn.

In FIG. 1, the supporting elements SE1–SEn are applied from the outside in the interspace (interstice) between two adjacent chamberless ribbon stacks in each case (for example with the aid of a lay up operation). Two types of supporting elements SE1–SEn can be inserted into the interspaces of the ribbon stacks BS1–BSn. In the first case, the supporting elements SE1–SEn fill the interspaces virtually completely. In this case a flexible material is desirably chosen for them. In the second case the supporting elements SE1–SEn only partly fill the interspaces. A stiff, in particular internally supported, material is advantageously chosen for these.

In the first case, the supporting elements desirably have an approximately triangular or wedge-shaped profile in cross section (cf. FIG. 1) to fill the interspaces between the ribbon stacks BS1–BSn as completely as possible.

In order to secure the chamberless ribbon stacks BS1 to BSn with the ribbon lines BD1 to BDk with respect to their position around the circumference, that is to say to hold their ribbon lines BD1 to BDk in the circumferential direction in the respective stack and in place, the supporting elements SE1 to SEn extend in the radial direction at least exactly as far as the ribbon stacks BS1 to BSn. The supporting elements SE1 to SEn lie with their inner end directly on the core element KE. By this means it is ensured that the supporting elements SE1 to SEn fulfill their function as independent, position-securing separating walls or intermediate walls, supported on the core element KE, for the ribbon stacks BS1 to BSn. In the region of the contact surface of the respective supporting elements SE1 to SEn on the core element KE (base), their outer walls desirably contact the outer walls of the respective two adjacent ribbon stacks BS1 to BSn. The respective two adjacent ribbon stacks BS1 to BSn have a clearance (gap width) of between 0.5 mm and 1.5 mm there. In FIG. 1, for example, the supporting element SEn completely fills the narrow inner gap SP of the interstice tip at the base of the two adjacent ribbon stacks BSn and BS1. The gap SP between the two innermost ribbon lines BD1 bearing directly against the core element KE, at the base of the two adjacent ribbon stacks BS1 and BSn, is thus completely bridged by the supporting element SEn. Since the interstices between the ribbon stacks BS1 to BSn enlarge in a V-shaped manner radially outwardly, the wall thickness of the supporting elements SE1 to SEn is desirably also enlarged outwardly. They fill the empty space between two adjacent ribbon stacks BS1 to BSn as far as possible completely to laterally support their side walls of ribbon lines BD1 to BDk loosely laminated one on top of the other. The incorporated supporting elements SE1 to SEn thus act as laterally supporting buffers between the ribbon stacks BS1 to BSn. In the event of kinking, bending, torsion or compressive loads, this prevents to a certain extent the ribbon lines from being displaced in each case from their stack assembly or even detached. In the circumferential direction, the supporting elements SE1 to SEn expediently have a wall thickness of at least 0.25 mm, and is preferably between 0.5 and 1.5 mm, in the interior region. For the supporting elements SE1–SEn, at least 2 mm, in particular between 3 mm and 5 mm, are chosen in the circumferential direction in the exterior region.

To assist the buffer and holding function of the supporting elements SE1 to SEn in the circumferential direction, a relatively easily deformable material is desirably chosen for them. This preferably has a modulus of elasticity of between 0.001 and 1 $N/mm^2$. Materials preferably suitable for this purpose are, for example, profiles of flexible PU foam, thick, soft wool or cotton fibers, yarns or rovings of textile filaments or glass filaments, foam rubber materials, etc.

These materials may desirably be additionally provided with conventional swelling agents to ensure close bearing of the supporting elements SE1 to SEn, in the interstices, against the side walls of the ribbon lines BD1 to BDk loosely laminated to form ribbon stacks BS1–BSn.

If appropriately designed, the relatively soft supporting elements SE1 to SEn may additionally also provide a certain protection against radial forces. For this purpose, the radial extent of the supporting elements SE1 to SEn is advantageously chosen so as to be larger than the radial extent of the ribbon stacks BS1 to BSn. In particular, the profiles of the supporting elements SE1 to SEn may project beyond the stacks BS1 to BSn by 0.5 mm to 2.5 mm. With the aid of these measures, it is also achieved, with a low stiffness of the supporting elements SE1–SEn, that the latter absorb radially acting forces in the manner of absorbent pillars. This mechanism is obtained in particular in the interaction with the core element KE acting as a compression-resistant foundation. If, for example, a transverse compressive force acts radially inwards in the region of the supporting element SE1 on the optical cable OC1, the supporting element SE1 is somewhat compressed and elastically deformed. By virtue of the direct bearing of the supporting element SE1 against the core element KE, however, this force is absorbed and directed radially inwardly to the core element KE. By this means, a compression of the ribbon stacks BS1 to BSn is to a certain extent avoided.

In the second case, the supporting elements SE1–SEn only partly fill the interspaces (interstices) between the ribbon stacks BS1–BSn. They are thus placed into the interspaces with, in each case, an empty space on both sides, that is to say towards their two adjacent ribbon stacks. The supporting elements SE1–SEn then serve primarily as radially extending spacers and supporting pillars with respect to forces acting radially. A stiff, smooth material is desirably chosen for this kind of supporting elements SE1–SEn. To assist the pillar and supporting effect of the supporting elements SE1 to SEn, a material with an elasticity modulus of at least 500–5000 N/mm, preferably between 700 and 2000 $N/mm^2$, can expediently be used. They advantageously project above the ribbon stacks BS1–BSn by approximately 0.5–1 mm. By means of this measure and because of their stiffness, a defined clearance between the ribbon stacks BS1–BSn and a closed cover layer SS additionally applied to the supporting elements is thereby ensured. A free compression space SR as safety zone in the event of radial forces occurring is thus available.

The remaining gaps between the respective two adjacent ribbon stacks advantageously permit a certain displaceability of the individual elements with respect to one another without stressing of them occurring. In this arrangement, the supporting elements SE1–SEn secondarily fulfill the function of separating walls and represent a kind of spacer also in the circumferential direction. To prevent this kind of supporting elements SE1–SEn from displacing or turning over, for example directly after lay up, they are desirably fixed in their position. The fixing may be carried out, for example, at the base of the core element KE and/or at the radially outer end of the supporting elements SE1–SEn. For example, the supporting elements SE1–SEn may, for example, be adhesively bonded onto the core element KE and/or placed or plugged into suitable, prepared depressions of the core element KE. In FIG. 1, a groove-shaped depression VT in the core element KE for receiving the supporting element foot of the supporting element SEn is indicated with dotted lines. At their radially outer end, the supporting elements SE1–SEn may be surrounded for example by an external, closed cover layer SS for positional fixing. The fixing may preferably also be carried out with a reinforcement helix which is applied helically to the supporting elements SE1–SEn. It is also possible to adhesively bond the supporting elements SE1–SEn to the cover layer or the reinforcement helix. If appropriate, a certain degree of fixing is also possible by filling the remaining interspaces with an adhesive, viscous material (PIB-containing material). The danger of turning over is also reduced by the fact that the supporting elements SE1–SEn run helically around the cable longitudinal axis and thus form a type of supporting ring.

The supporting elements SE1–SEn may, seen in cross section, also be composed of varying materials. They may be in particular internally supported. For example, in the case of the supporting element SEn of FIG. 1 a supporting body STn, indicated with dot-dash lines, extends radially over the entire length of this supporting element. This supporting body STn is composed of a relatively hard, low-compressibility material for a defined, radial spacing, in particular for a compression-resistant pillar function in a radial direction, whereas those regions of the supporting element SEn remaining at the right and left have cushioning properties and serve only for the positional securing of the adjacent ribbon stacks BS1 and BSn in the circumferential direction.

For positional securing, a stiff supporting body QTn running transversely to the radial extent of the supporting element SEn may also be advantageously incorporated, in particular injected. In FIG. 1, this supporting body QTn is drawn with dot-dash lines in the supporting element SEn. The supporting body QTn is expediently located in the radially outer region of the supporting element SEn. By this means, it advantageously has a preferred bending plane, which makes turning over of the supporting element SEn more difficult. This type of supporting element preferably acts in the circumferential direction. A combination of the two supporting bodies STn and QTn finally leads to a T-girder-like, optimized supporting body TTn, which combines the advantages that: it provides the supporting element SEn with a compression-resistant pillar function in the radial direction and at the same time with a sufficient positional securing in the circumferential direction.

In all three alternative embodiments of the supporting body, a soft material with cushioning properties is advantageously used for the remaining regions of the supporting element SEn in each case.

The cover layer SS, designed, for example, in the form of a film, is expediently applied externally onto the supporting elements SE1 to SEn. If appropriate, the cover layer SS may be designed as a transverse-pressure-resistant tube. The layer SS desirably lies on the supporting elements SE1 to SEn which, if appropriate, project over the ribbon stacks BS1 to BSn, so that they cover the sensitive ribbon stacks BS1 to BSn outwardly. The supporting elements SE1–SEn or their supporting bodies STn are expediently curved or rounded in the circumferential direction in their radially outer regions to ensure a flat bearing-on of the cover layer SS. Between the covering SS and the ribbon stacks BS1 to BSn, a free compression space SR is then available as safety zone. The protective layer SS may advantageously have a hard, thin outer layer HAS and a soft inner layer WIS. The hard outer layer HAS advantageously protects the ribbon stack against deformations. The soft inner layer WIS represents a cushion for the ribbon stacks BS1 to BSn.

Finally, a reinforcement BW and/or a multilayer outer sleeve AH may, if appropriate, be applied to this cover layer SS for protection against mechanical stresses, so that the optical cable OC1 is produced.

With this cable design, the positional securing of the ribbon stacks BS1 to BSn is essentially associated with the supporting elements SE1 to SEn. The latter serve as compression-resistant supporting elements or radial spacers and/ or as buffer elements or positional securing between the ribbon stacks BS1 to BSn. By contrast, the ribbon stacks BS1 to BSn can scarcely be mechanically stressed. They form independent, separately manufacturable, preferably chamberless lay-up elements which are composed of ribbon lines BD1 to BDk loosely laminated one above the other.

Figure 2:
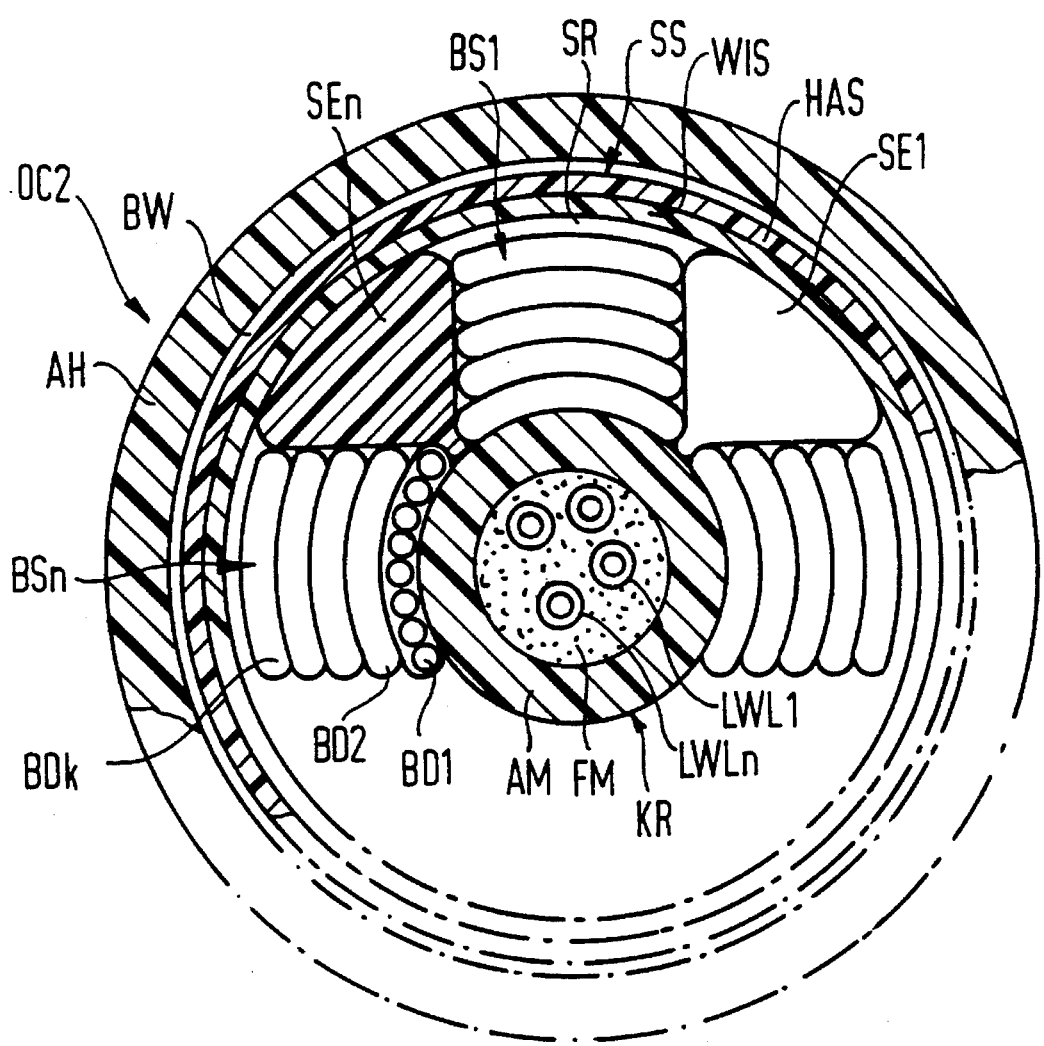
FIG. 2 illustrates a cross section of a modification of the optical cable shown in FIG. 1 having a tubular core element.

As a modification of FIG. 1, in FIG. 2 the core element of the optical cable OC2 is designed as a tube KR. The elements transferred unchanged are provided with the same reference characters as in FIG. 1. The tubular outer sheath AM of an optical transmission element contains a plurality of optical waveguides LWL1 to LWLn embedded in a filling material FM. The strength of the design of the cable core is achieved by an adequate dimensioning of this outer sheath AM. The outer sheath AM is advantageously built up of a plurality of layers.

Instead of the optical waveguides LWL1 to LWLn, conventional electrical conductors or tensile-load-resistant elements, such as steel or aramid wires for example, may also be introduced, if appropriate, into the core element designed as a tube KR. As an alternative to this, however, it is also possible to leave this tube KR empty and use it, for example, for the longitudinal ducting of pressurized gas for the purpose of monitoring the optical cable OC2.

FIG. 3 shows an optical cable OC3 constructed in two layers. Its cable core has an identical, by analogy with FIG. 1, inner layer LA1 with a cover layer SS1. Elements transferred unchanged from FIG. 1 are provided with the same reference characters as in FIG. 1. On this first, inner layer LA1 there is applied a similarly constructed, second lay-up layer LA2 with supporting elements SE1* to SEn*, with ribbon stacks BS1* to BSn* and with a cover layer SS2* arranged thereon. In the outer layer LA2, ribbon stacks and/or supporting bodies different in shape and size from the inner layer LA1 may expediently be used.

Multilayer arrangements are expediently laid up in reversed-lay. By this means, a secured, continuous supporting of the supporting elements of the various layers is ensured.

FIG. 4 illustrates how an optical cable OC1 according to FIG. 1 can be produced. The central core element KE is taken off, corresponding to the arrow TR to the right-hand side, from a rotating supply bobbin VKE. From supply bobbins (VBD11 to VBD1k, ..., VBDn1 to VBDnk), which are arranged in a fixed annular manner around the longitudinal axis of the core element KE, optical waveguide ribbons BD1 to BDk are unwound. These are assembled to form approximately rectangular ribbon stacks BS1 to BSn (indicated by small rectangles in FIG. 4) and are fed to a common lay-up point VP in a device VVN (which is designed analogously to a lay-up nipple). At the lay-up point of the device VVn, the rectangular ribbon stacks BS1 to BSn are laid up annularly around the core element KE. Simultaneously with this lay-up operation of the ribbon stacks BS1 to BSn, the supporting elements SE1 to SEn are unwound in a downstream second rotationally symmetrical and fixed arrangement of supply bobbins VSE1 to VSEn and also fed to the common lay-up point VP of the device VVN. The supporting elements SE1 to SEn are introduced from the outside between the interstices of the ribbon stacks BS1 to BSn. For the protection of the ribbon stacks BS1 to BSn against deformations and compressions, a cover layer SS is extruded with the aid of a downstream extruder EX1 onto this layer of supporting elements SE1 to SEn. For the additional mechanical protection against tensile, flexural and torsional stresses, a reinforcement BW may advantageously be applied to the cover layer SS with a device BWV. In the extruder EX2, a multilayer outer sleeve AH is finally applied onto the reinforcement BW if appropriate. A downstream, rotating caterpillar take-off unit RA positively grasps the optical cable OC1 thus produced and feeds it to a rotating winding drum TL. In this arrangement, the caterpillar take-off unit RA serves the purpose of taking off the central core element KE from its supply bobbin VKE, taking off the lay-up elements such as the optical waveguide ribbon lines BD1 to BDk and the supporting elements SE1 to SEn from their supply bobbins and feeding them to their common lay-up point in the device VVN. Torsion of the central core element KE is prevented in that the drums VKE and TL and the caterpillar take-off unit RA rotate synchronously and codirectionally.

FIG. 5 shows an apparatus similar to that in FIG. 4 for producing the optical cable OC1 according to FIG. 1 with the only difference that the supply bobbins VSE1 to VSEn for the supporting elements SE1–SEn are omitted. The elements transferred unchanged are provided with the same reference characters as in FIG. 4. An extruder EXS with an extruder head EK designed as a multi-orifice die is arranged downstream of the device VVN. In this arrangement, the die orifices of the multi-orifice die in the extruder head EK correspond to the profile of the supporting elements SE1 to SEn. During the production process, independent profiles of supporting elements SE1 to SEn are extruded from the multi-orifice die of the extruder head EK. These are cooled and brought by means of the feed device ESE to their intended position between the ribbon stacks BS1–BSn.

If appropriate, the ribbon stacks BS1–BSn with the supporting elements SE1–SEn to be introduced between them can also be SZ laid up. In this case the two supply bobbins VKE and TL, for example, are fixed, whereas the central element KE and the cable core are rotated or twisted, with alternating lay direction, on a lay-up route between a first additional caterpillar take-off unit, corresponding to RA, upsteam of the lay-point VP and the caterpillar take-off unit RA. These two SZ caterpillar take-off units advantageously rotate approximately synchronously. The additional caterpillar take-off unit has been omitted in FIG. 5 for the purpose of clarity.

We claim:
1. An optical cable comprising: a core element, a plurality of ribbon stacks, each stack being formed by a plurality of optical waveguide ribbons, said stacks being arranged in at least one layer around said core element and supporting elements adjacent to the ribbon stacks said supporting elements being designed as independent profiles and each of said supporting elements being arranged in the interspace between two adjacent ribbon stacks, said supporting elements extending in radial direction at least as far as the ribbon stacks and lying with their inner ends on the core element such that said supporting elements contribute for positionally securing the ribbon stacks relative to each other.

2. The optical cable of claim 1 wherein the core element further comprises at least one tensile-load-resistant element.

3. The optical cable of claim 2 wherein a thickening layer is applied to the tensile-load-resistant element.

4. The optical cable of claim 1 wherein the core element is a tube.

5. The optical cable of claim 4 wherein at least one optical waveguide is located in the tube.

6. The optical cable of claim 1 wherein the plurality of ribbon stacks are curved in an arcuate manner around the core element.

7. The optical cable of claim 1 wherein the optical waveguide ribbons form approximately rectangular ribbon stacks.

8. The optical cable of claim 1 wherein the optical waveguide ribbons within a their ribbon stack are provided with an increasing number of optical waveguides towards the outside.

9. The optical cable of claim 1 wherein a radial extent of a ribbon stack is smaller than its extent about the circumference.

10. The optical cable of claim 9 wherein the radial extend is between 1 mm and 3 mm, and the extend along the circumference is between 1.5 mm and 5 mm.

11. The optical cable of claim 1 wherein each of the ribbon stacks has between 2 and 10 optical waveguide ribbons and each of the waveguide ribbons has from 2 to 16 optical waveguides.

12. The optical cable of claim 1 further comprising:

a filling material between the optical waveguide ribbons.

13. The optical cable of claim 12 wherein the filling material is adhesive.

14. The optical cable of claim 1 wherein the ribbon stacks are laid up on the core element.

15. The optical cable of claim 14 wherein a lay length of the ribbon stacks is between 400 mm and 700 mm.

16. The optical cable of claim 1 wherein adjacent ribbon stacks have a clearance at their base between 0.5 mm and 1.5 mm.

17. The optical cable of claim 1 wherein the supporting elements only partly fill interstices between the ribbon stacks.

18. The optical cable of claim 1 wherein the supporting elements completely fill the interstices between the ribbon stacks.

19. The optical cable of claim 1 wherein the supporting elements have an approximately wedge-shaped cross section.

20. The optical cable of claim 1 wherein the supporting elements comprise a stiff material.

21. The optical cable of claim 1 wherein the supporting elements comprise an easily deformable material.

22. The optical cable of claim 1 wherein the supporting elements comprise a material containing a swelling agent.

23. The optical cable of claim 1 wherein the supporting elements are comprised of a material having a modulus of elasticity between 0.001 and 1N/mm$^2$.

24. The optical cable of claim 1 wherein the supporting elements are further comprised of a radially extending hard supporting body in the interior and a cushioning outer region.

25. The optical cable of claim 1 wherein a stiff supporting body runs transversely to a radial extent of the supporting elements.

26. The optical cable of claim 1 wherein the supporting element is further comprised of a T-girder-shaped supporting body.

27. The optical cable of claim 1 wherein the supporting elements are in a fixed position.

28. The optical cable of claim 1 further comprising:

a cover layer applied onto the ribbon stacks and the supporting elements.

29. The optical cable of claim 28 wherein the cover layer comprises a thin, hard outer layer.

30. The optical cable of claim 28 wherein the cover layer comprises a cushioning inner layer.

31. The optical cable of claim 28 further comprising:

an outer sheath applied to the cover layer.

32. The optical cable of claim 1 wherein the ribbon stacks are located in chamber elements.

33. A method for producing an optical cable comprising the steps of:

supplying a plurality if ribbon stacks, each of said stacks being formed by at least one layer of optical waveguide ribbons;

attaching the plurality of ribbon stacks to a core element; and supplying and securing support elements into interspaces between adjacent ribbon stacks on the core element to secure the ribbon stacks in position relative to each other.

34. The method of claim 33, further comprising:

the additional step of applying an additional layer of ribbon stacks and support elements.

35. The method of claim 33 wherein the ribbon stacks and supporting elements are laid up jointly in a respective layer.

36. The method of claim 33 wherein the step of supplying a plurality of ribbon stacks comprises the additional step of removing optical waveguide ribbons from an optical waveguide supply bobbin, and wherein the step of supplying support elements comprises the additional step of removing support elements from a support element bobbin.

37. The method of claim 33 wherein after the step of attaching the ribbon stacks the method further comprises:

the additional step of passing the ribbon stacks through an extruder and extruding profiles for support elements.

38. The process of claim 33 comprising the additional step of applying a cover layer on top of the ribbon stacks and support elements.

39. The process of claim 33 comprising the additional step of externally applying an outer sleeve on top of the ribbon stacks and support elements.

* * * * *